(No Model.) 4 Sheets—Sheet 2.

G. W. MANSFIELD & I. F. BAKER.
CAR TRUCK.

No. 508,956. Patented Nov. 21, 1893.

WITNESSES

INVENTORS
Isaac F. Baker
George W. Mansfield
BY
H. C. Townsend
ATTORNEY (No Model.) 4 Sheets—Sheet 3.

G. W. MANSFIELD & I. F. BAKER.
CAR TRUCK.

No. 508,956. Patented Nov. 21, 1893.

WITNESSES
J. A. Hurdle
John H. Capel

INVENTORS:
Isaac F. Baker
George W. Mansfield
BY
H. C. Townsend
ATTORNEY

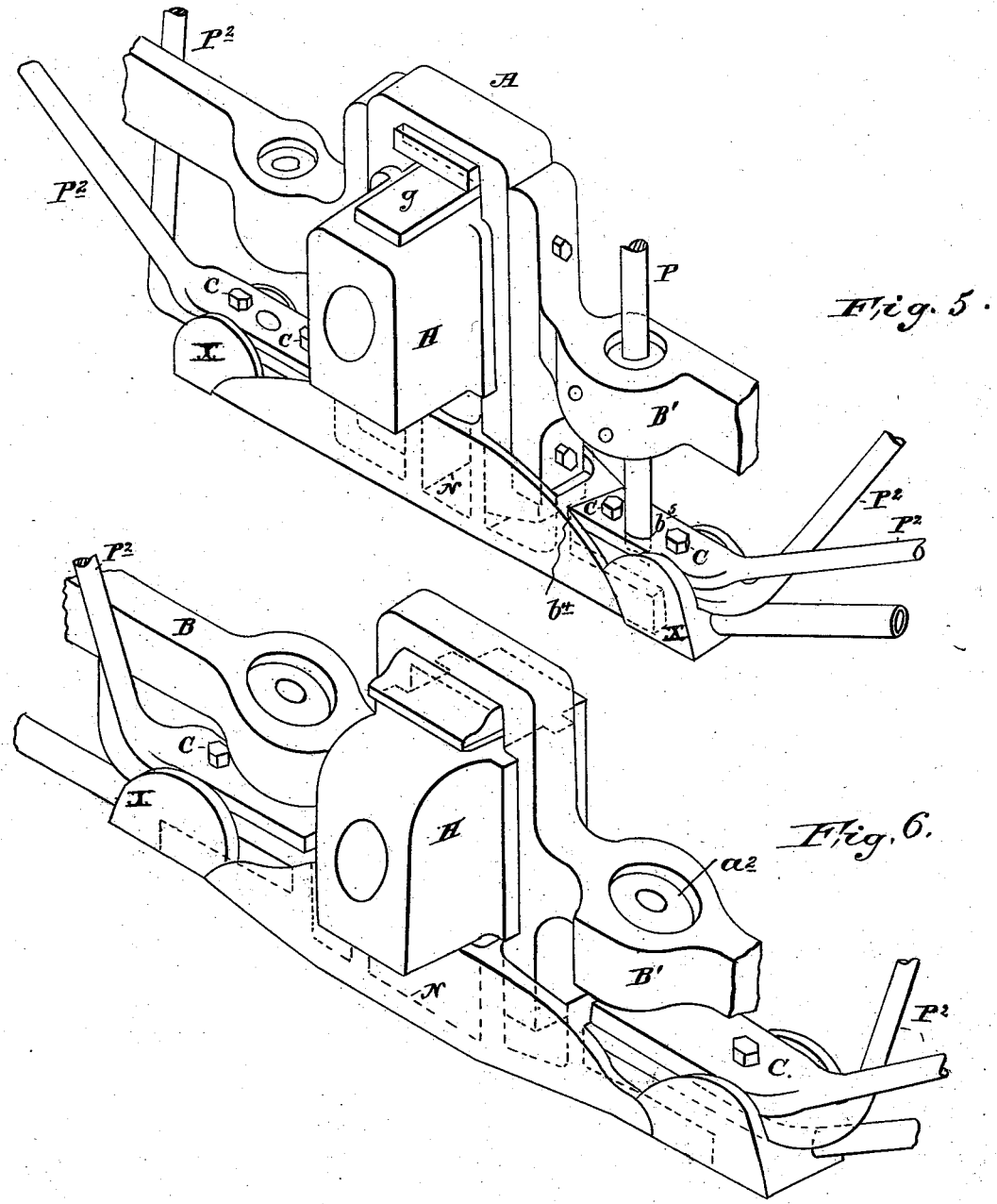

UNITED STATES PATENT OFFICE.

GEORGE W. MANSFIELD AND ISAAC F. BAKER, OF LYNN, MASSACHUSETTS, ASSIGNORS TO THE THOMSON-HOUSTON ELECTRIC COMPANY, OF CONNECTICUT.

CAR-TRUCK.

SPECIFICATION forming part of Letters Patent No. 508,956, dated November 21, 1893.

Application filed November 30, 1889. Serial No. 332,151. (No model.)

*To all whom it may concern:*

Be it known that we, GEORGE W. MANSFIELD, a citizen of the United States, and ISAAC F. BAKER, a subject of the Queen of England, residents of Lynn, in the county of Essex and State of Massachusetts, have invented certain new and useful Improvements in Car-Trucks, of which the following is a specification.

Our invention relates to the construction and mounting of car trucks and the manner of supporting the car body thereon, as well as to the means of supporting an electric motor used for propelling the car.

The object of our invention is to secure strength and cheapness, while at the same time permitting a proper spring movement of the car body.

Our invention consists in the features of construction and the combination of parts hereinafter described and more particularly specified in the claims.

Figure 1:
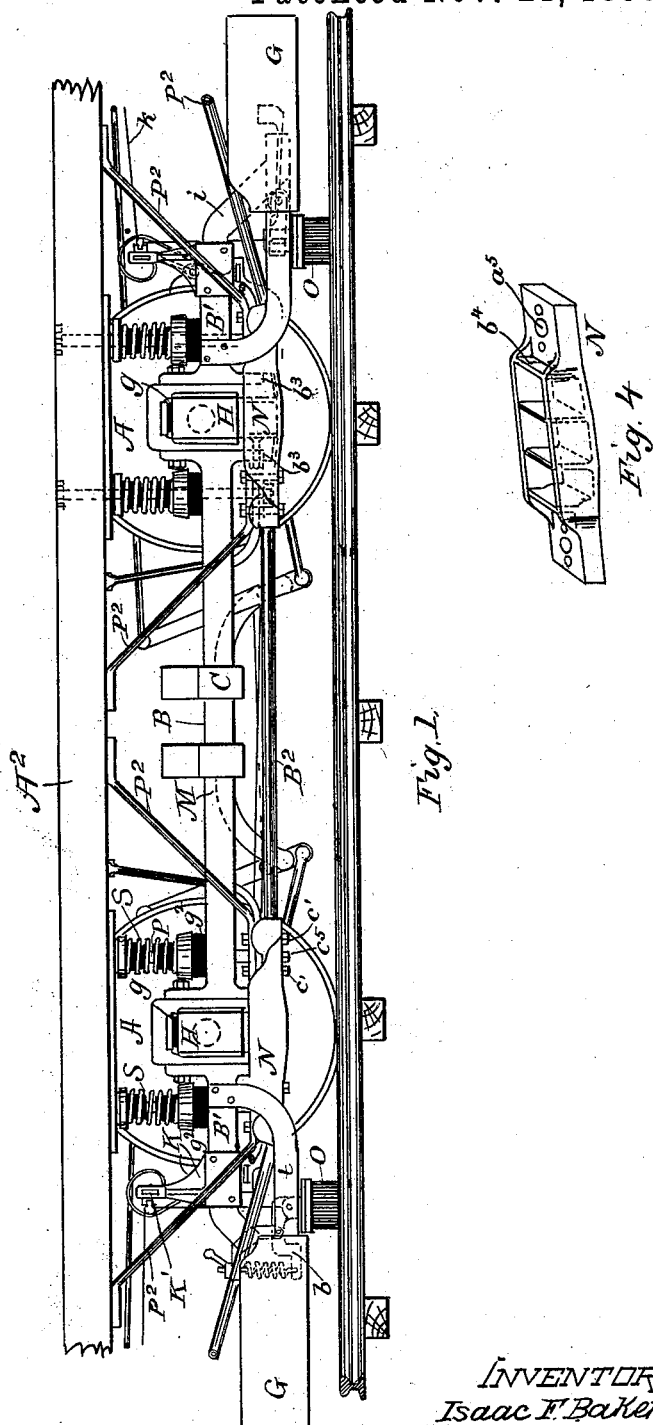
Figure 2:
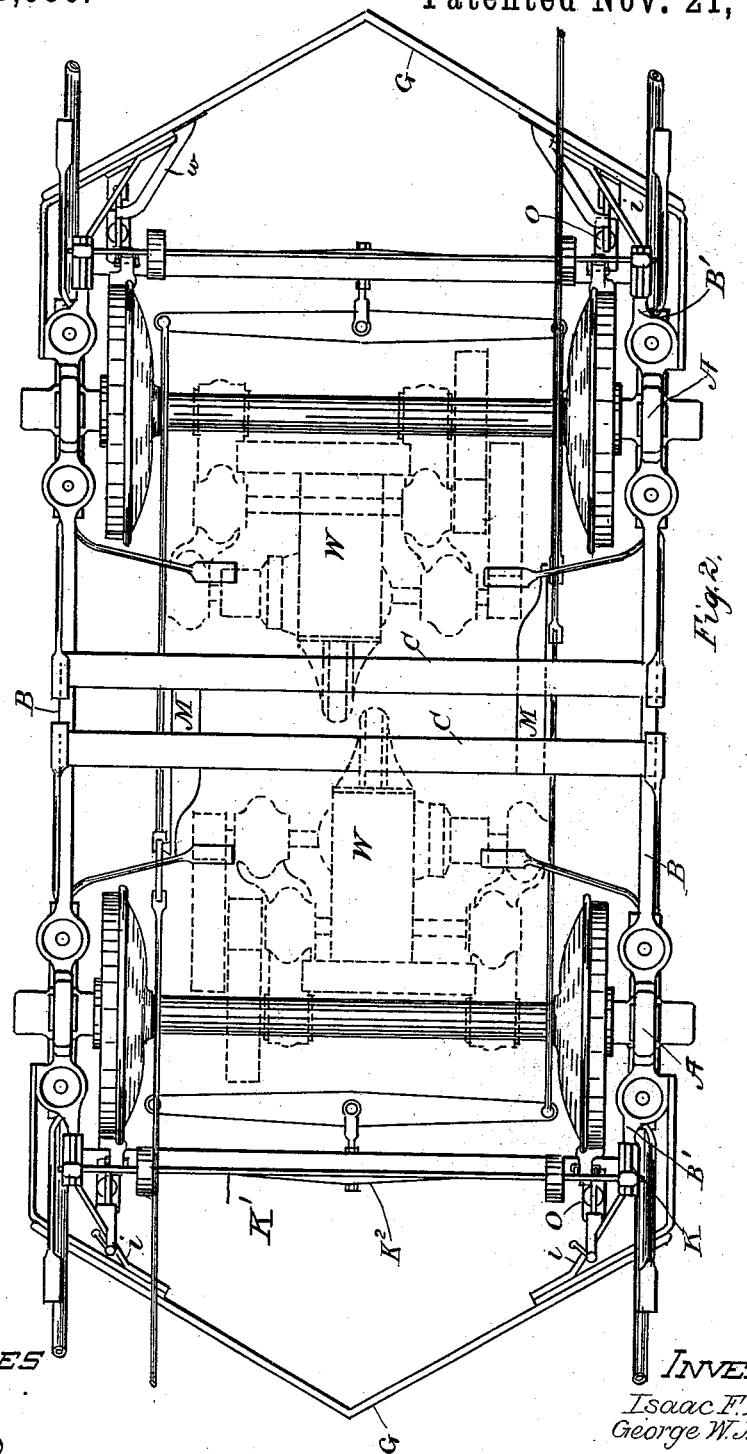
Figure 3:
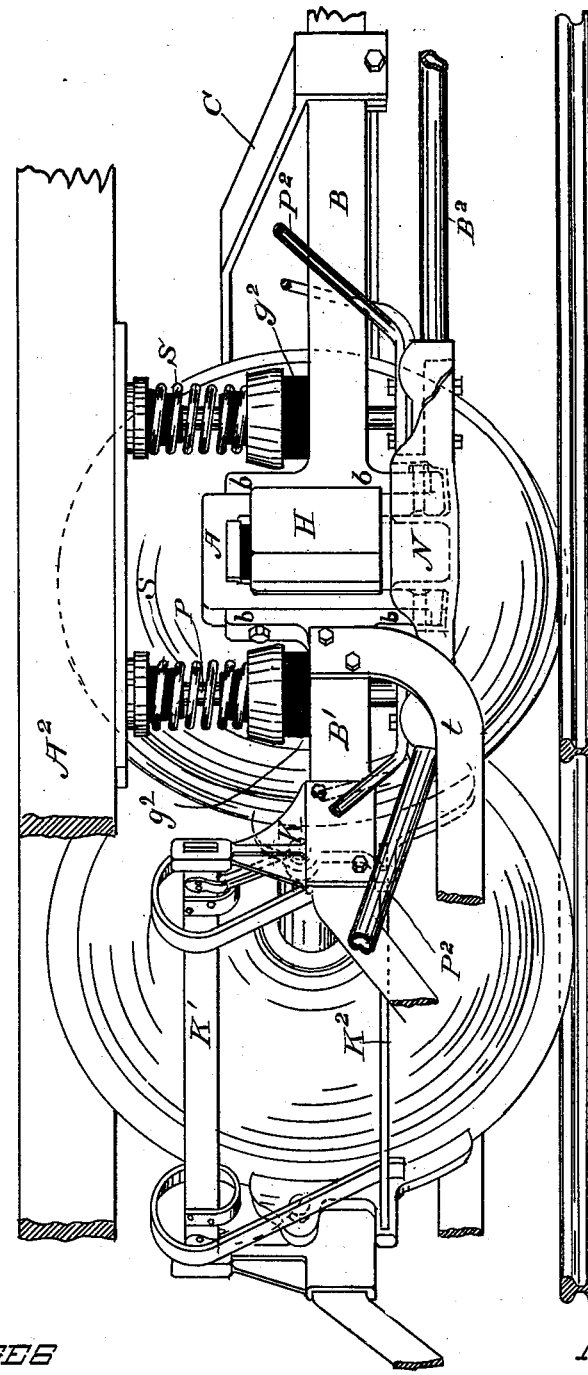

In the accompanying drawings:—Figure 1, is a side elevation of a truck embodying our invention. Fig. 2, is a plan of the same. Fig. 3, is a perspective view of one end of the truck. Fig. 4, is a perspective view of a guide box or plate. Fig. 5, is a perspective view of one end of the truck frame detached. Fig. 6, is a similar view in which the truck frame is shown as made in one piece.

H, H, indicate the journal or axle boxes upon which the truck frame A, B, B', is directly imposed. Preferably a cushion $g$, is interposed between the frame and the journal box, as indicated, to take up the jar and prevent it from being transmitted to parts supported on the frame as hereinafter described. Such cushion might, however, be dispensed with. The cushions $g$, may be of rubber, or any other suitable material, and suitably held in a socket made like that indicated at $a^2$, Fig. 6, formed in the part A, of the truck frame. The parts A, B, B', are united together as shown to form the side bar of the frame, and the part A, is preferably constructed so as to engage with and be capable of sliding on the journal box H, so as to be held against horizontal movement. The side bars B, are united to the sides of the pedestal, yoke or saddle part A, in which the journal box is located by means of bolts as shown, which pass through heads or flanges formed on the end of the bar B. The extension B', is also united to the side of the saddle part in a similar manner. To assist in forming a good and firm connection between the side rods or bars and the journal guides A, we provide the horns of the part A, with lugs or steps $b^3$, Figs. 1, 3 and 5, on which the ends of the bar B, or the extension B', may rest.

$A^2$, is the sill of the car and S, S, are springs by which the car is supported directly upon the truck frame as indicated. Washers or cushions of rubber $g^2$, may, if desired, be interposed between the truck frame and the lower spring plates. The springs are imposed upon the truck frame at opposite sides of the saddle part A, as indicated to equalize the pressure.

P, P, are guide bolts or posts which pass down through the springs and spring plates and through suitable guide openings in the truck frame. These bolts or posts extend between the car sill and a guide plate or box N, which is sustained by the car body and is guided upon some co-operating part of the truck frame, as for instance by the horns of the pedestal A.

$P^2$, are brace-rods connecting the car body with the plates N. The posts P, unite the plates N, with the car sill in the manner to be presently described.

The guide piece or block N, has guides cast within it as shown in Fig. 4, which allow it to slide vertically inside or on the horns of the pedestal A, or to co-operate in a like manner with any similar formation upon the truck frame, but prevent any longitudinal movement of one with relation to the other. Hence any longitudinal movement of the car body with relation to the car truck is prevented, and should one end of the car be more heavily loaded than the other no distorted stress or strain can act upon the lower ends of the posts P. By the arrangement by which the guide-plates N, are caused to directly engage the pedestals or some other part of the truck-frame, I prevent all strains upon the axle-boxes and take it up by the truck-frame or the pedestals forming a part thereof.

B², is a strut or brace-rod uniting the guide boxes N, or parts connected with the same.

The manner of connecting the brace-rods, strap-rods, posts P, and boxes N, is illustrated more clearly in Figs. 5 and 6. The brace-rods are enlarged or flattened at their ends and rest between the upturned sides of shoes or plates X, the ends of which shoes as well as the ends of the brace-rods abut against a shoulder $b^4$, on the plate N, while the shoe X, itself rests on an extension of such guide box N. Bolts $c$, $c$, hold the parts together, for that purpose passing down through the brace-rods and preferably to the under side of the extension of box N, where suitable nuts are provided as shown at $c'$, $c'$, Fig. 1. The post P, rests by means of a shoulder at $b^5$, on the ends of the braces which latter together with piece X, are firmly held together against the shoulder preferably by means of a nut engaging the lower end of the post bolt which for that purpose is extended through the plate N, at an opening $a^5$, therein.

$c^5$, Fig. 1, is the nut which engages with the end of said post. By taking off the nuts of the bolts which hold these various parts together, the box or guide N, may be removed thus allowing the axle-box to be taken out with the smallest amount of labor. It is obvious that some of the nuts and bolts might be dispensed with, or that the outer bolt $c$, might pass down through the plate X, at a part thereof beyond the extension of box N. It is also obvious that the nut of the post bolt P, might be dispensed with. It is preferable, however, that both the bolts $c$, should pass through the part X, as well as the extension of box N.

C, C, are cross bars or bridges uniting the side bars B, as indicated, and W, W, are electric motors sustained at one end from said cross bars C, in any suitable manner. Extensions from such motors or the frames thereof are sleeved upon the car axles and movement is communicated from the armatures of such motors to the car axles by gearing, as indicated. The manner of supporting the motor on the car axle and transmitting the movement thereto is well understood in the art. The cross or arch bars C, also sustain brake-pieces M, on which the brake levers are fulcrumed in any suitable manner. Standards K, formed in one piece with or attached to the truck-frame or the extensions B', therefrom at each end, are united by the end pieces K', which may constitute alone, or in connection with other parts, the end pieces of the truck frame. From the cross pieces K', the brake bar K², is sustained through any usual or proper devices. By thus sustaining the brakes the relative position of the brake shoes and wheels of the car is not changed with varying loads on the car body, and when the brakes are applied no disagreeable and destructive jarring can be communicated to the car body. By our construction the parts of the brake mechanism retain their relative position in all cases.

G, is the life-guard or fender which is sustained by arms $t$, secured to or forming extensions of the part B' of the truck frame. The fenders are rigidly united to the arms $t$, and additional brace-rods extending from the part B', of the said frame, may also be used as indicated at $i$.

We do not limit ourselves to any particular conformation of the guide plate or box N, as all that is necessary is that it should engage with, so as to be capable of sliding freely up and down on the frame but shall be held firmly against any longitudinal movement or tilting action.

While we have shown the truck frame as made in a number of pieces attached together, it would still be possible to forge or cast it in a single piece. We do not claim, however, making the truck frame in a single piece in this application as a claim therefor has been made in another application for patent filed by us of even date herewith.

We do not herein broadly claim the mode of supporting the truck-frame and the guide-frame upon the axle boxes, nor the means of supporting the car upon said truck frame. Nor do we herein claim the method of supporting the propelling motor or the means for sustaining the fender. All these form the subject-matter of and are claimed by us in our application, Serial No. 332,150, filed November 30, 1889.

What we claim as our invention is—

1. The combination with a truck frame having side bars imposed directly upon the journal boxes, of a car body directly supported by springs resting on the side bars of said frame, and guide plates or boxes sustained from the car body and adapted to slide in engagement with co-operating parts upon the truck frame as and for the purpose described.

2. In a railway car, the combination with the saddle parts, of the uniting iron side bars having heads or flanges at their ends bolted directly to the side of the saddle parts.

3. The combination with the saddle parts having steps $b^3$, of the uniting side bars resting on said steps and bolted to the saddle parts.

4. In a railway truck, a saddle part or yoke piece A, having steps or projections $b^3$, as and for the purpose described.

5. The combination with the truck frame imposed directly upon the journal boxes and having saddle parts or guides engaging with said boxes, of the car body spring supported on said frame, and guide boxes carried by the car body and engaging with said saddle parts, as and for the purpose described.

6. The combination with the truck frame having a side bar provided with a saddle piece A, sustained on the journal box, of a guide box or plate sustained on the car sill and engaging with the downwardly depending horns of the said saddle.

7. The combination with a truck frame imposed on the journal boxes and having saddle parts or guides A, for said boxes, of the guides N, adapted to slide on the horns of part A, independently of the journal boxes, as and for the purpose described.

8. The combination, substantially as described, with the truck frame consisting of side bars and uniting end bars, the said side bars being supported directly on the journal boxes, a guide box carried by the car body and engaging co-operating parts upon the frame, supporting springs resting on the said bars and supporting the car body, a cross bar uniting the said side bars, and a driving motor sustained from the said cross bar.

9. The combination with the journal box pedestal or saddle part A, the guide N, engaging with downwardly depending extensions of said pedestal or saddle part and sustained from the car body by suitable braces or supports bolted to extensions of said guide, and the post P, uniting the car body with the guide, as and for the purpose described.

10. The combination with the frame resting on the journal-box, of the guide N, co-operating with parts upon said frame braces secured to the car body and fastened to the guide, and post P, having shoulders $b^5$, as and for the purpose described.

11. The combination with the truck side bars, of the standards K, a cross bar uniting the same, and a brake beam suspended from said cross bar.

12. A truck frame composed of side bars mounted directly on the journal box, cross arch bars near the center of said side bars, and the cross frame at the ends uniting said ends and supporting the brake mechanism.

13. A truck frame having side bars supported upon the axle boxes independently of the car body, said bars having at each end uprights united by a cross bar from which uprights or cross bars brake shoes are suspended by links.

14. The combination, substantially as described, of a truck frame having side bars supported upon the axle boxes independent of the car body, uprights at the ends of said bars united by a cross bar, and wheel brake shoes suspended by links from said cross bar.

15. The combination, in a car truck, of the wheels, the axle boxes, a frame supported by said axle boxes, pillars supported from the frame, a cross bar uniting the pillars, links depending from said cross bars, wheel brake shoes supported from said links, and a brake operating mechanism operatively connected with the brake shoes.

16. The combination, in an electric railway truck, of a motor sustaining frame having a saddle part or pedestal part A, mounted directly upon the journal box, a car body spring sustained on said frame, guide boxes or plates N, sustained from the car body and adapted to slide in engagement with co-operating parts on said frame, and uniting bars $B^2$, as and for the purpose described.

Signed at Lynn, in the county of Essex and State of Massachusetts, this 27th day of November, A. D. 1889.

GEORGE W. MANSFIELD.
ISAAC F. BAKER.

Witnesses:
JOHN W. GIBBONEY,
DUGALD McKILLOP.